United States Patent [19]
Pedrotti

[11] 3,872,566
[45] Mar. 25, 1975

[54] MULTIPLEXED INTEGRATED CIRCUIT CHIP BONDING SYSTEM

[75] Inventor: Donald G. Pedrotti, Cupertino, Calif.

[73] Assignee: GCA Corporation, Sunnyvale, Calif.

[22] Filed: Feb. 27, 1974

[21] Appl. No.: 446,403

[52] U.S. Cl. .............................. 29/203 B, 29/203 P
[51] Int. Cl. ............................................ H05k 13/04
[58] Field of Search ........... 29/203 P, 203 B, 203 R, 29/208 C

[56] References Cited

UNITED STATES PATENTS 3,641,648 2/1972 Kalberman ........................ 29/203 B

*Primary Examiner*—Thomas H. Eager
*Attorney, Agent, or Firm*—Flehr, Hohbach, Test, Albritton & Herbert

[57] ABSTRACT

A multiplexed integrated circuit chip bonding system is provided where a central station controlled by a single operator controls several remote programmed automatic bonding stations. Joystick controls are provided at the central station for X, Y and $\theta$ prealignment of each remote bonding station which are sequentially coupled to the central station when they are respectively ready for alignment. A T.V. for each remote station is provided at the control station so that all bondings stations may be concurrently examined for defective operation A closed loop servo system provides for X and Y motion and provides for variable speed in both directions of operation. An open loop micro-switch system provides $\theta$ adjustment for fast and slow speeds. In the foregoing manner, the operator has the same feeling as if manipulating a mechanical control on a standard automatic bonding machine.

5 Claims, 9 Drawing Figures

MULTIPLEXED INTEGRATED CIRCUIT CHIP BONDING SYSTEM

BACKGROUND OF THE INVENTION

The present invention is directed to a multiplexed integrated circuit chip bonding system.

High speed programmed bonders for bonding leads onto the pads of a semiconductor chip or die are at the present time in commercial use in many parts of the world. In general, the automatic bonding machines require an operator at that machine to make a prealignment of the device and thereafter the machine will make all bonds in an automatic sequence. With the high speed programmed bonder, the operator's time is utilized for one to three seconds and thereafter the machine runs automatically for 9 to 12 seconds. The operator is used for 30% of the time and productivity is mainly dependent on device geometry and machine speed.

In order to increase productivity it is known that when several automatic or programmed bonders are in use a single operator is required to move from machine to machine to accomplish the pre-alignment. This system contributes to operator fatique and makes the productivity operator speed dependent.

OBJECT AND SUMMARY OF THE INVENTION

It is, therefore, an object of the present invention to provide a multiplexed integrated circuit chip bonding system which permits the operator to be seated comfortably and view the operation of a series of bonders and align each in sequence without physical exercise or re-orientation from machine to machine.

In accordance with the above object there is provided a multiplexed integrated circuit chip bonding system having a plurality of individual automatic bonding stations with each station having a T.V. camera. Means are provided for aligning bonding pads on a die to correct for die misalignment. The aligning means include X, Y and $\theta$ means for correspondingly moving the pad whereupon the automatic station bonds all required wires on the pads of the die. The invention comprises a multiplex master control station which includes a plurality of grouped T.V. monitors respectively corresponding to the T.V. cameras of the automatic stations. Manual control means are included and are operable by a single operator in conjunction with one of the grouped T.V. monitors for selectively aligning the bonding pad in a selected and remote bonding station. Means are provided for coupling the manual control means to the X, Y and $\theta$ means of each automatic bonding station for operating such X, Y and $\theta$ means. Sequencing means are responsive to the completion of alignment at one automatic station to couple the manual control means to the next automatic station which is ready for alignment.

BRIEF DESCRIPTION OF THE DRAWINGS

FIG. 8 is a partial side elevational view of a portion of FIG. 1 partially cut away showing part of the closed loop control system coupling the remote bonding station with the master station; and FIG. 9 is an elevational view partially cut away of the manual control means for the $\theta$ or angular control unit of FIG. 2.

DETAILED DESCRIPTION OF THE PREFERRED EMBODIMENT

Figure 1:
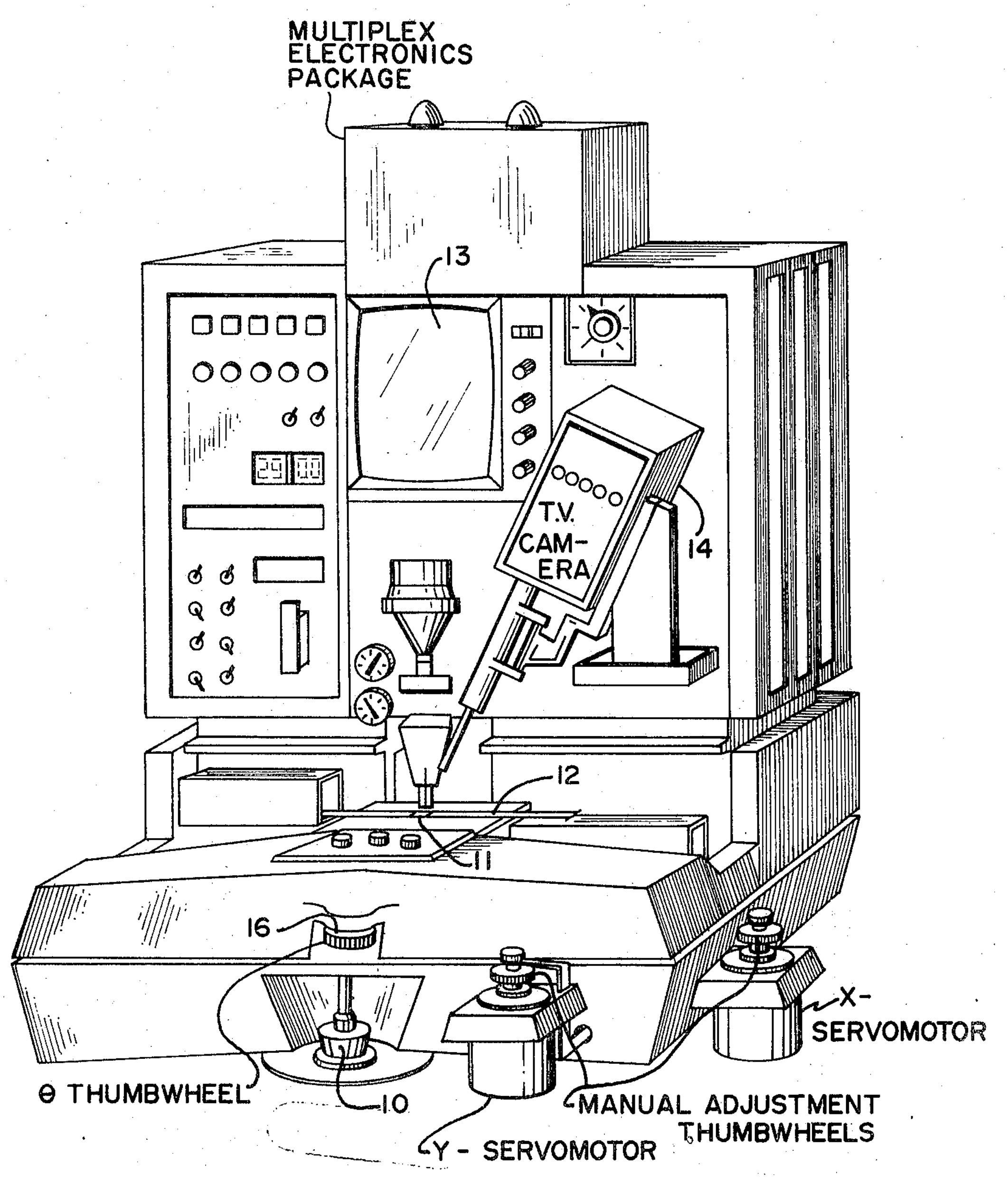
FIG. 1 is a perspective view of a remote automatic bonding station which has been modified in accordance with the teachings of the present invention.

FIG. 1 illustrates a typical automatic or programmed bonding station where the bonding program is contained on a read only memory on a small programmed card which is inserted in the control panel. In normal use, the operator sits at the machine and by the use of the mechanical control stick 10 aligns the semiconductor die 11 which is on a strip 12 to a set of cross hairs or reticle superimposed on a magnified television image which occurs on the T.V. monitor 13 and is provided by the T.V. camera 14 which is directed at die 11. The machine measures the movements required to center the die. The operator then presses an alignment complete button causing the bonding machine to begin its automatic cycle. No further operator attention is required until all the wires have been bonded on the device. Bonding is completed and the machine signals such completion.

More specifically, alignment is completed by the operator by moving the mechanical control stick 10 in X and Y directions and a mechanical linkage moves the table upon which the die 11 has been fixed. At the same time, a $\theta$ thumb wheel 16 is rotated which is coupled to a motor to provide for angular rotation between two predetermined limits.

As thus far described, the automatic bonder is entirely standard in the art and may be purchased, for example, from the GCA Corporation, under the name Multi-Matic Lead Attach Model 1,100. However, as will become apparent below, individual T.V. monitors 13 on the remote stations may be eliminated if desired.

Figure 2:
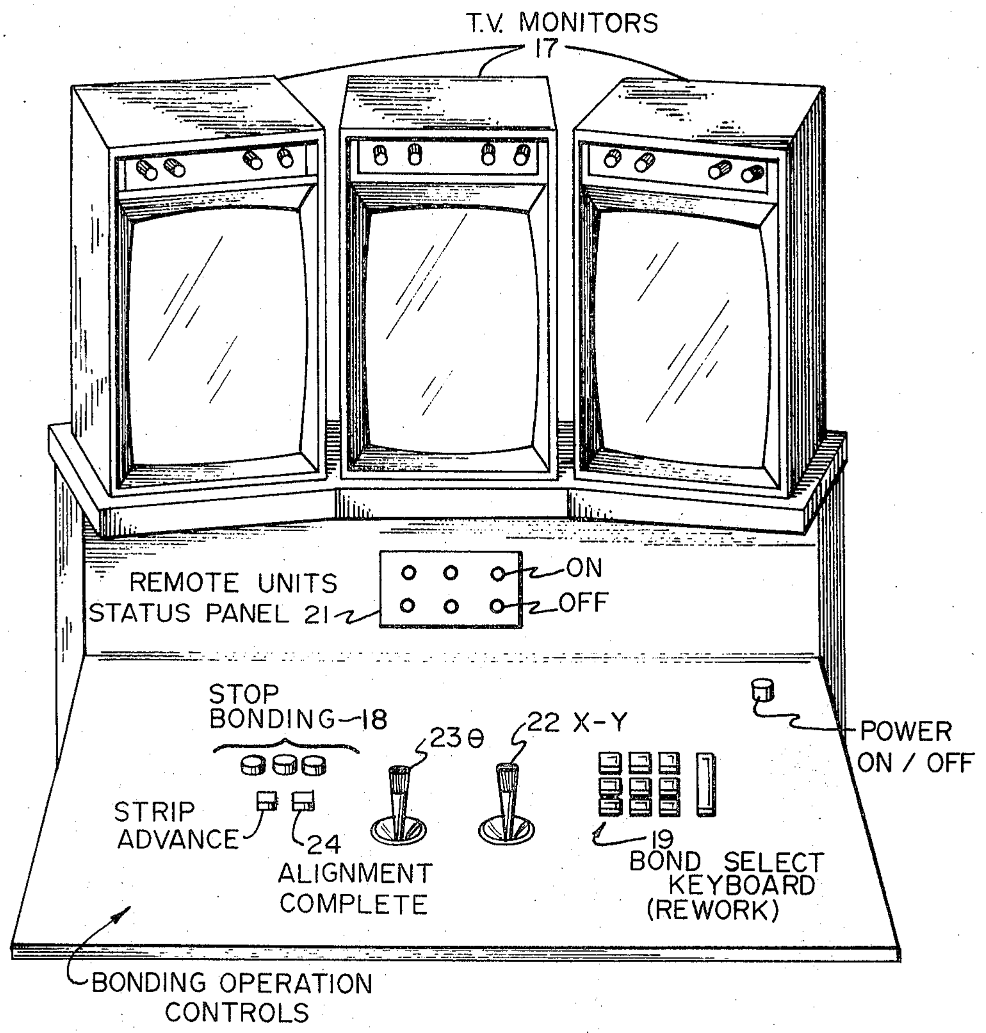
FIG. 2 is a front view of a multiplex master control station for controlling the remote automatic stations.

In accordance with the invention as has been illustrated in FIG. 2, a multiplex master control station is provided which includes the grouped T.V. monitors 17 which respectively correspond to T.V. monitors on, for example, three different remote bonding stations as is illustrated in FIG. 1. Thus, there is a T.V. monitor for each bonder so that in case of malfunction of any bonder which is operating automatically, the operator may immediately take corrective action. Such corrective action would include stopping the bonding operation on that particular bonder which is accomplished by the stop bonding buttons 18 and then utilizing the bond select keyboard 19 for reworking the defective bonding. Such bond select keyboard is also well-known in the art. In conjunction with T.V. monitors 17 is a remote unit status panel 21 where the top row of lights indicate which bonder is being prealigned and the bottom row of lights non-selected bonders. The three columns of lights correspond respectively to the above T.V. monitors.

The multiplex master control station also includes manual control means operable by a single operator sitting at the master control station which are in the form of joysticks or control sticks 22 and 23. Joystick 22 is for the purpose of X, Y alignment and joystick 23 for the purpose of angular or $\theta$ alignment. Joysticks 22 and 23 are commercially available, for example, from Measurement Systems Incorporated of Norwalk, Coneticut under Model 521 $X_1Y$ Potentiometer. In the case of X–Y control 22, the joystick is unmodified and is movable in any angular direction. In the case of $\theta$ control 23, movement occurs only in the Y or up/down direction, up providing one direction of rotation and the down movement of the control stick providing the other direction of rotation between predetermined rotational limits.

In operation, the operator aligns the reticle generated in the T.V. camera with the pads on a particular semiconductor die and then presses the alignment complete button 24 which causes the controls to be switched to the next automatic bonding station which is ready for alignment. The remote unit status panel 21 indicates to which unit the alignment controls are coupled.

Figure 3:
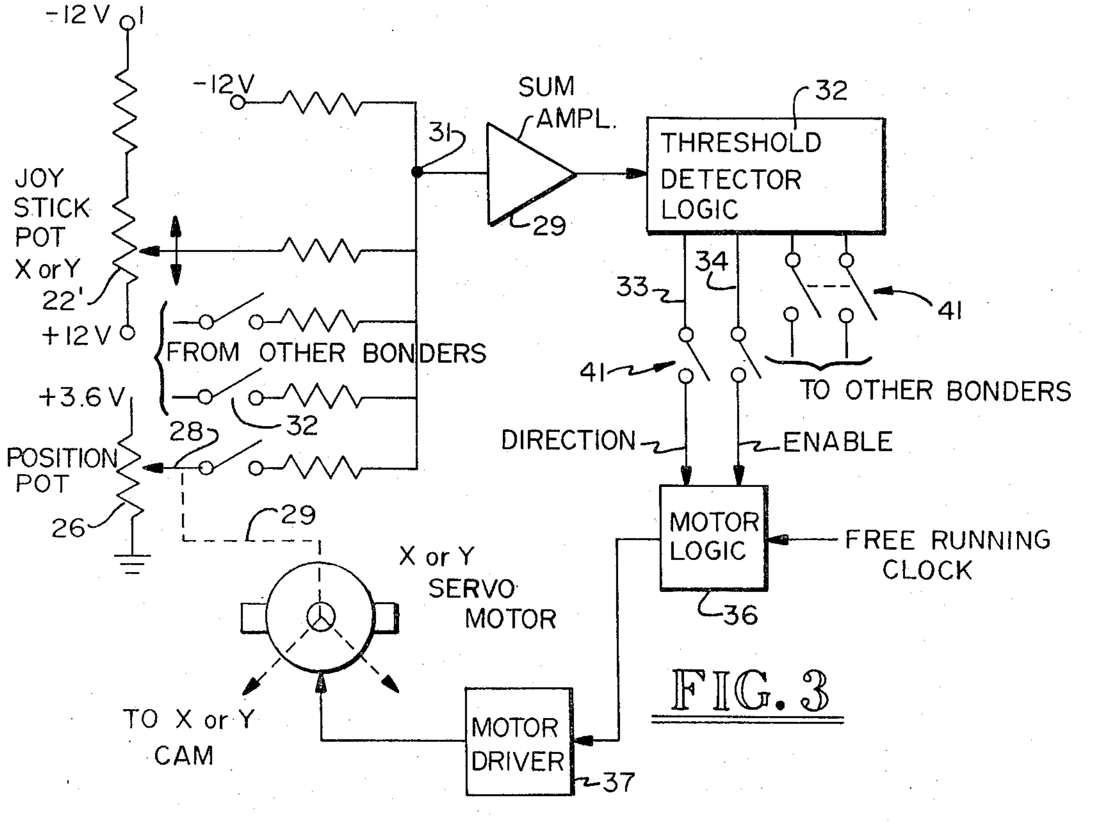
FIG. 3 is a circuit schematic of the servo system interconnecting the remote station of FIG. 1 with the master station of FIG. 2.

FIG. 3 illustrates the closed loop servo system for coupling the X, Y control 22 to the X, Y servo motors which are installed on the casing of each automatic and remote bonding station as illustrated in FIG. 1. There is, of course, a separate servo system for both X and Y directions. As discussed above, joystick 22 is coupled to potentiometers for both X and Y direction which are indicated as 22' in FIG. 3. The actual position of the X or Y servo motor is indicated by the position potentiometer 26 which is mechanically coupled by link 27 to the X and Y servo motors. The output of position potentiometer 26 is coupled on line 28 through a resistor to a summing amplifier 29 which also has as an input the output of joystick potentiometer 22'. Thus, the desired position provided by the joystick potentiometer 22' is compared with the actual position of potentiometer 26 and an error voltage is generated at summing point 31 which is amplified by summing amplifier 29. Switches 32 provide for sequencing between various bonders. Only a single X or Y system is illustrated but there are, of course, as illustrated in FIG. 1 both a separate X servo motor and a separate Y servo motor for each automatic bonding station. Thus, the switches shown are merely representative of the many additional switches which would be required.

Figures 4, 5:
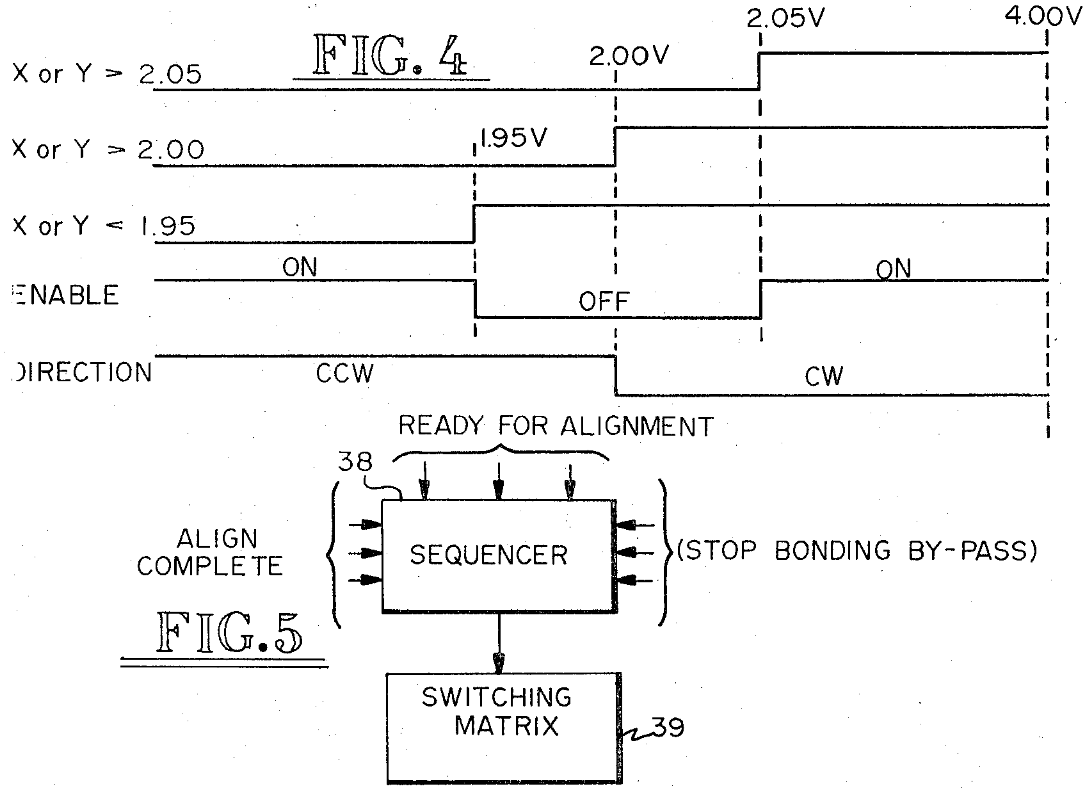
FIG. 4 are logic diagrams illustrating the operation of the threshold detector logic unit of FIG. 3.
FIG. 5 is a block diagram illustrating the sequencing operation between remote automatic bonding stations.

The output of summing amplifier 29 is coupled to a threshold detector logic unit 32 which senses whether the output error voltage is above or below a nominal 2 volts. This is illustrated in FIG. 4 where the distance between 1.95 volts and 2.05 volts is a dead region where no control adjustment is obtained. Above 2.05 volts, an enable signal is on and clockwise rotation of the drive motor is provided. Below 1.95 volts an enable signal is also on with the direction being the opposite or counter clockwise. Thus, the detector logic in accordance with FIG. 4 provides both a direction signal on line 33 and an enable signal on line 34 to control the motor logic unit 36. Such unit is driven by a free running clock which provides stepping pulses to motor driver unit 37 which drives the X or Y stepping servo motors. The servo motor turns a profile cam to produce a mechanical movement of a small magnitude which will be described below in conjunction with FIG. 1.

The system of FIG. 3 provides variable speeds since the master motor clock or free running clock is set as fast as the digital servo motor can reliably start and stop without missing steps. When the joystick is moved very fast, the motor detection circuit will always lag slightly behind the joystick position and the motor will move at full clock speed. If the joystick is moved slowly, the detection circuit will be satisfied as fast as the motor steps so that all of the motor clock pulses are not utilized and to the motor it appears that the clocking rate is slower. With this design, the operator receives the feeling of a rate of approach just as if the operator were operating the mechanical joystick 10 of FIG. 1 which is a direct mechanical direction.

FIG. 5 illustrates the switching circuit for sequencing from one bonder to the next. Each bonder sends a signal to the sequencer unit 38 when it is ready for alignment. After alignment has been completed, an alignment complete signal is produced by the operator on the central console by pressing button 24, and the sequencer sequences to the next bonder which is ready. If it is desired not to utilize a particular bonder, one of the stop bonding buttons 18 of the master control unit may be pressed to bypass the particular bonder. Sequencer unit 38 drives the switching matrix 39 which drive all of the appropriate switches; for example, switches 32 as indicated in FIG. 3, and also switches 41 on threshold detector logic unit 32.

Figure 6:
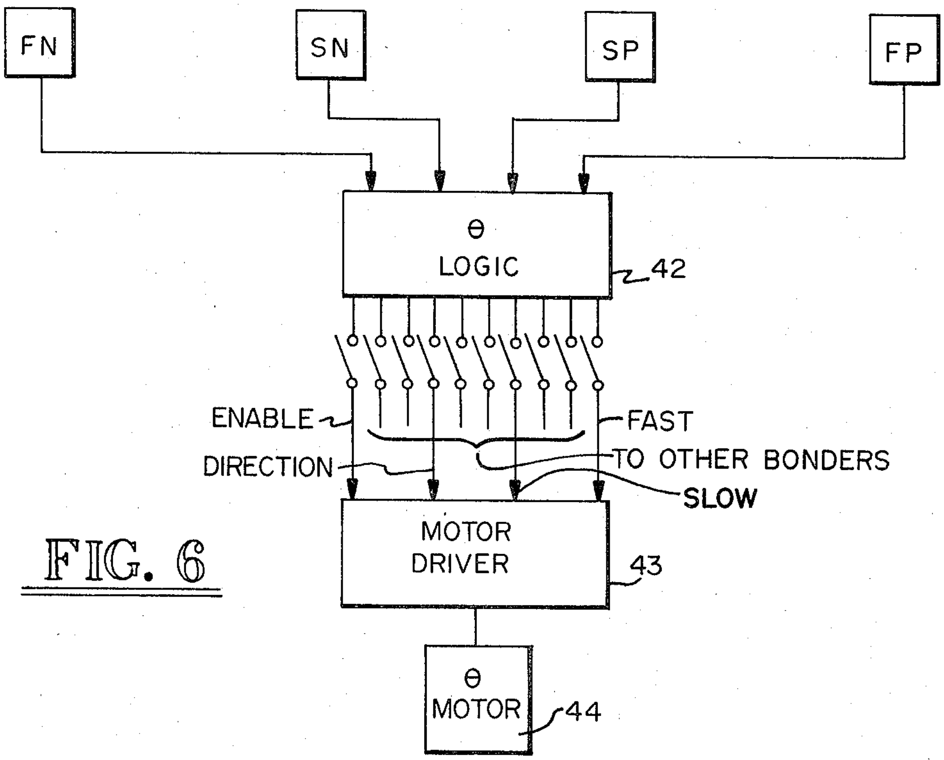
FIG. 6 is a block diagram illustrating the open loop control system for controlling the angular position of the integrated circuit chip on remote bonding stations.
Figure 7:
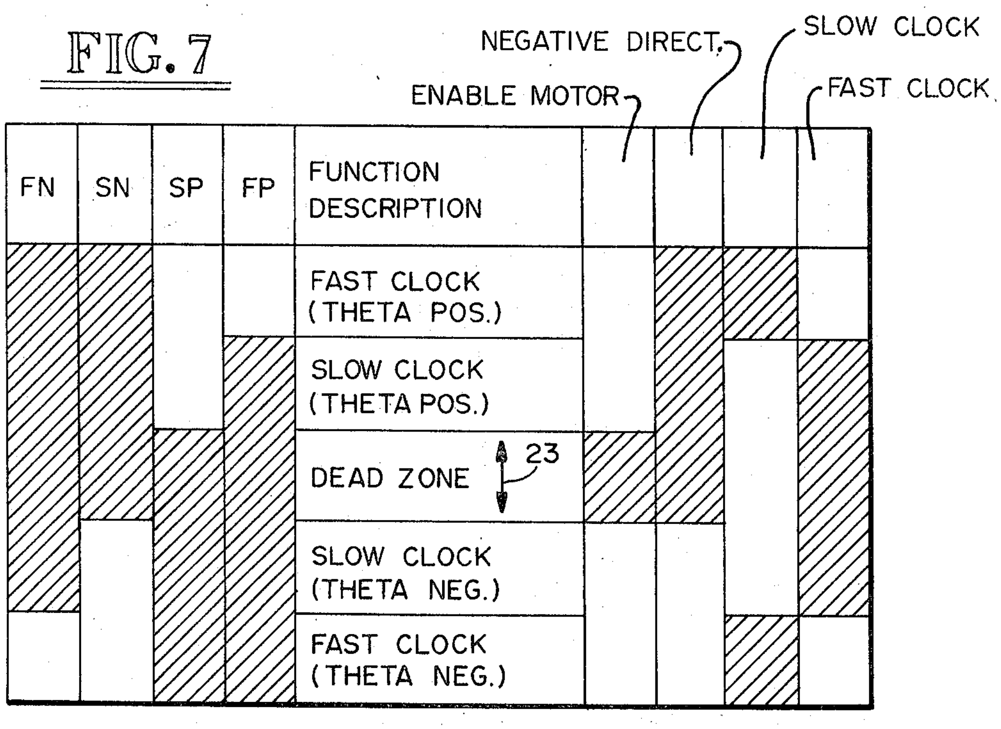
FIG. 7 is a table useful in understanding the operation of FIG. 6.

Referring to FIG. 6 for $\theta$ or angular control, this is accomplished by an open loop system with four microswitches designated FN, SN, SP and FP. These drive a $\theta$ logic unit 42 which provides both enable and direction signals to a motor driver unit 43 which in turn drives the $\theta$ motor of a particular bonding station 44. The four above-described control signals are provided by four micro-switches on the $\theta$ joystick 23 (FIG. 2) to provide for both fast and slow $\theta$ motion in either a positive or negative direction as illustrated in FIG. 7. In other words, imagining joystick 23 moves through the functional descriptive zones as indicated the various micro switches FN, SN, SP and FP are turned on and off as indicated by the clear and cross-hatched areas respectively. The signals are then processed by the $\theta$ logic unit 42 in the manner as indicated in the right hand portion of FIG. 7 to provide enable, direction and slow and fast signals. This is logically accomplished by simple ORing procedures, for example, an ORing of FP and FN produces the enable motor signal.

FIG. 9 illustrates the $\theta$ control lever joystick 23 along with a cam 45 which by means of its cam surfaces actuates micro-switches 46 and 47. These represent two of the micro-switches illustrated in FIG. 6; a second cam is also provided (not shown) which actuates two other microswitches in accordance with the spatial diagram of FIG. 7. As discussed above, joystick 23 moves in only a single vertical plane as illustrated.

FIG. 8 illustrates the modifications of the remote stations of FIG. 1 to provide for remote servo control of the existing mechanical X and Y movement apparatus. The lever 48 is already present in the remote bonding station and is coupled to the manual control stick 10. X or Y stepping servo motor are connected to lever 48 by a linking lever 49 which is spring biased with a spring 51 against a cam 52. This cam is driven by the X or Y stepping motors to provide for the appropriate X or Y movements. The stepping motor also drives the potentiometer 26 which referring to FIG. 3 provides the current position of the stepping motor, cam 52, and also the X or Y lever 48. The foregoing is mounted on a casting 53 which is of course, a portion of the exterior cabinet of the remote bonding station illustrated in FIG. 1.

Still referring to FIG. 1, the box designated "multiplex electronic package" is also an additional modification of the remote bonding station and includes the motor driver circuits for both the $\theta$ and X, Y movements.

Thus, the present invention has provided an improved multiplexed integrated circuit chip bonding system where the operator may be seated comfortably at one central control panel and control several remote automatic bonders. In the preferred embodiment, three bonders have been illustrated but depending on the automatic bonding time more could be added. With the present invention, the operator's time is efficiently utilized since during the time one bonder is operating automatically, another is being pre-aligned.

I claim:

1. A multiplexed integrated circuit chip bonding system having a plurality of individual automatic bonding stations each station having a T.V. camera and means for aligning bonding pads on a die to correct for die misalignment said aligning means including X, Y and $\theta$ means for correspondingly moving said pad whereupon the automatic station bonds all required wires on the pads of the die said system comprising: a multiplex master control station including a plurality of grouped T.V. monitors respectively corresponding to said T.V. cameras of said automatic stations and including manual control means operable by a single operator in conjunction with one of said grouped T.V. monitors for selectively aligning said bonding pad in a selected and remote automatic bonding station; means for coupling said manual control means to said X, Y, and $\theta$ means for each automatic bonding station for operating such X, Y and $\theta$ means including sequencing means responsive to the completion of alignment at one automatic station to couple said manual control means to the next automatic station which is ready for alignment.

2. A system as in claim 1 where said means for coupling said manual control means to said X, Y and $\theta$ means includes a closed loop servo system for said X and Y coupling and an open loop system for said $\theta$ coupling.

3. A system as in claim 2 where both said closed and open loop systems are direction sensitive.

4. A system as in claim 2 where said loop systems include means for varying the speed of response.

5. A system as in claim 1 in which said manual control means includes an X-Y potentiometer actuated by a joystick.

* * * * *